United States Patent
Veness

(10) Patent No.: US 9,788,524 B2
(45) Date of Patent: Oct. 17, 2017

(54) MOVABLE PARTITION USABLE WITH ANIMAL KENNEL, AND KENNEL APPARATUS

(71) Applicant: Doskocil Manufacturing Company, Inc., Arlington, TX (US)

(72) Inventor: David Veness, Fort Worth, TX (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 413 days.

(21) Appl. No.: 14/035,063

(22) Filed: Sep. 24, 2013

(65) Prior Publication Data

US 2014/0083366 A1    Mar. 27, 2014

Related U.S. Application Data

(60) Provisional application No. 61/704,703, filed on Sep. 24, 2012.

(51) Int. Cl.
*A01K 1/02* (2006.01)
*A01K 31/06* (2006.01)
(Continued)

(52) U.S. Cl.
CPC .......... *A01K 1/0245* (2013.01); *A01K 1/0236* (2013.01); *A01K 1/033* (2013.01);
(Continued)

(58) Field of Classification Search
CPC .. A01K 1/0011; A01K 1/0005; A01K 1/0035; A01K 1/02; A01K 1/0236; A01K 1/03; A01K 1/032; A01K 1/033; A01K 1/034; A01K 31/10; A01K 31/07; Y10T 24/44026
(Continued)

(56) References Cited

U.S. PATENT DOCUMENTS 562,468 A * 6/1896 Hinman .................. A01K 31/12
119/468
1,052,234 A * 2/1913 Gaertner ................... B66C 1/48
119/467
(Continued)

FOREIGN PATENT DOCUMENTS

FR            2703215 A1 * 10/1994 ............. A01K 1/035

*Primary Examiner* — Son T Nguyen
(74) *Attorney, Agent, or Firm* — Global IP Counselors, LLP

(57) ABSTRACT

A movable partition is usable with an animal kennel to change the size of the reposable region of the kennel within which an animal can be disposed during the animal's period of growth. The reposable region is situated between the kennel door and the movable partition. The movable partition is mountable to ventilation openings formed in the animal kennel and is movable among a variety of distances from the kennel door to change the size of the reposable region within the kennel in order to properly train the animal and to avoid the animal relieving itself within the kennel. The partition includes a barrier element and a number of mounting elements that are mountable to the ventilation openings of the kennel. The movable partition further includes a number of clip apparatuses that are cooperable with the mounting elements to retain the mounting elements mounted to the ventilation openings.

14 Claims, 11 Drawing Sheets

(51) Int. Cl.
*F16B 13/00* (2006.01)
*A01K 31/07* (2006.01)
*A01K 1/03* (2006.01)

(52) U.S. Cl.
CPC .............. *A01K 1/034* (2013.01); *A01K 31/07* (2013.01); *F16B 13/00* (2013.01); *Y10T 24/44026* (2015.01)

(58) Field of Classification Search
USPC ....... 119/428, 452, 453, 459, 472, 473, 478, 119/489, 496
See application file for complete search history.

(56) References Cited

U.S. PATENT DOCUMENTS

| | | | | |
|---|---|---|---|---|
| 1,961,171 A * | 6/1934 | Sanford | ................ | A01K 31/12 119/468 |
| 6,971,333 B1 | 12/2005 | Hearrell | | |
| 2009/0250013 A1* | 10/2009 | Cash | ...................... | A01K 31/04 119/469 |
| 2009/0307883 A1* | 12/2009 | Schliessner | ........... | F16B 5/0685 24/584.1 |

* cited by examiner

MOVABLE PARTITION USABLE WITH ANIMAL KENNEL, AND KENNEL APPARATUS

CROSS-REFERENCE TO RELATED APPLICATION

The instant application claims priority from U.S. Provisional Patent Application Ser. No. 61/704,703 filed Sep. 24, 2012, the disclosures of which are incorporated herein by reference.

BACKGROUND

Field

The disclosed and claimed concept relates generally to animal kennels and, more particularly, to a movable partition that is usable with an animal kennel, and to a kennel apparatus.

Related Art

Animal kennels are generally known for use in the training and reposing of animals Animal kennels typically include some type of a door that can be opened and closed in order to enable an animal to be received within an interior of the kennel and removed therefrom. While such kennels have been generally effective for their intended uses, they have not been without limitation.

Kennel training, or crate training as it is sometimes known, is usable to housebreak a dog and for other types of training A dog will typically not relieve itself in the same place where it sleeps. However, if an animal is reposed within a kennel that is significantly larger than the animal itself, the animal may relieve itself in one part of the kennel and lie or sleep in another part of the kennel. Such a situation is counterproductive to the desired housebreaking training of an animal. It thus can be seen that an animal in training is desirably retained within a space that is sized appropriately for the animal. However, this can be difficult in some circumstances.

By way of example, when a large breed dog is raised from a small puppy to a full grown adult, the animal's size changes dramatically. While a pet owner potentially could purchase several different kennels of successively larger size in order to accommodate and train the growing animal, such a practice would be cost prohibitive. The owner of a puppy that is expected to grow to a much larger size is typically disinterested in purchasing numerous kennels of various sizes, many of which will be used for only a short period of time, and rather would prefer to purchase only a single kennel whose size will be suited to the animal when it is a full grown adult. In so doing, however, this leaves the potential for the animal, when small, to relieve itself in a far region of the kennel while lying or sleeping at another end of the kennel which, as set forth above, is undesirable. It thus would be preferred to provide an improved device that overcomes these and other shortcomings known in the relevant art.

SUMMARY

In view of the foregoing, an improved movable partition is usable with an animal kennel to change the size of the reposable region of the kennel within which an animal can be disposed during different stages of the animal's period of growth. The reposable region is situated generally between the kennel door and the movable partition. The movable partition is mountable to a number of ventilation openings formed in the animal kennel and is movable among a variety of distances from the kennel door to change the size of the reposable region within the kennel in order to properly train the animal and to avoid the animal relieving itself within the kennel. The partition includes a barrier element and a number of mounting elements that are mountable to the ventilation openings of the kennel. The movable partition further includes a number of clip apparatuses that are cooperable with the mounting elements to retain the mounting elements mounted to the ventilation openings.

Accordingly, an aspect of the disclosed and claimed concept is to provide an improved movable partition that is usable with an animal kennel and that is movable among a plurality of positions within the interior of the animal kennel in order to provide a corresponding plurality of differently sized reposable regions within which an animal can be placed for training and for other purposes.

Another aspect of the disclosed and claimed concept is to provide an improved kennel apparatus that includes such a movable partition.

Another aspect of the disclosed and claimed concept is to provide an improved clip apparatus that is usable as a part of such a movable partition.

Accordingly, an aspect of the disclosed and claimed concept is to provide an improved partition structured for use with an animal kennel that has a number of openings formed therein and that further has an interior within which an animal can be disposed. The partition can be generally stated as including a barrier apparatus that comprises a barrier element and a number of mounting elements that are disposed generally peripherally on the barrier element and that protrude from the barrier element, at least some of the number of mounting elements being structured to be mountable to at least some of the number of openings and being further structured to retain the barrier element in a given position within the interior, the barrier element being structured to resist the animal from moving therepast.

Another aspect of the disclosed and claimed concept is to provide an improved kennel apparatus that can be stated as including an animal kennel and the movable partition of the preceding paragraph.

Another aspect of the disclosed and claimed concept is to provide an improved clip apparatus structured for use with a barrier element and a number of mounting element that are situated on the barrier element and an animal kennel that has a number of openings formed therein. The clip apparatus can be generally stated as including at least a first pin structured to be engaged with a mounting element of the number of mounting elements to retain the mounting element in a condition mounted to an opening of the number of openings to retain the barrier element in a given position within the interior, and a locking lug structured to be engageable with an opening of the number of openings to retain the at least first pin in a position engaged with the mounting element of the number of mounting elements.

BRIEF DESCRIPTION OF THE DRAWINGS

A further understanding of the disclosed and claimed concept can be gained from the following Description when read in conjunction with the accompanying drawings in which:

Similar numerals refer to similar parts throughout the specification.

DESCRIPTION

Figure 1:
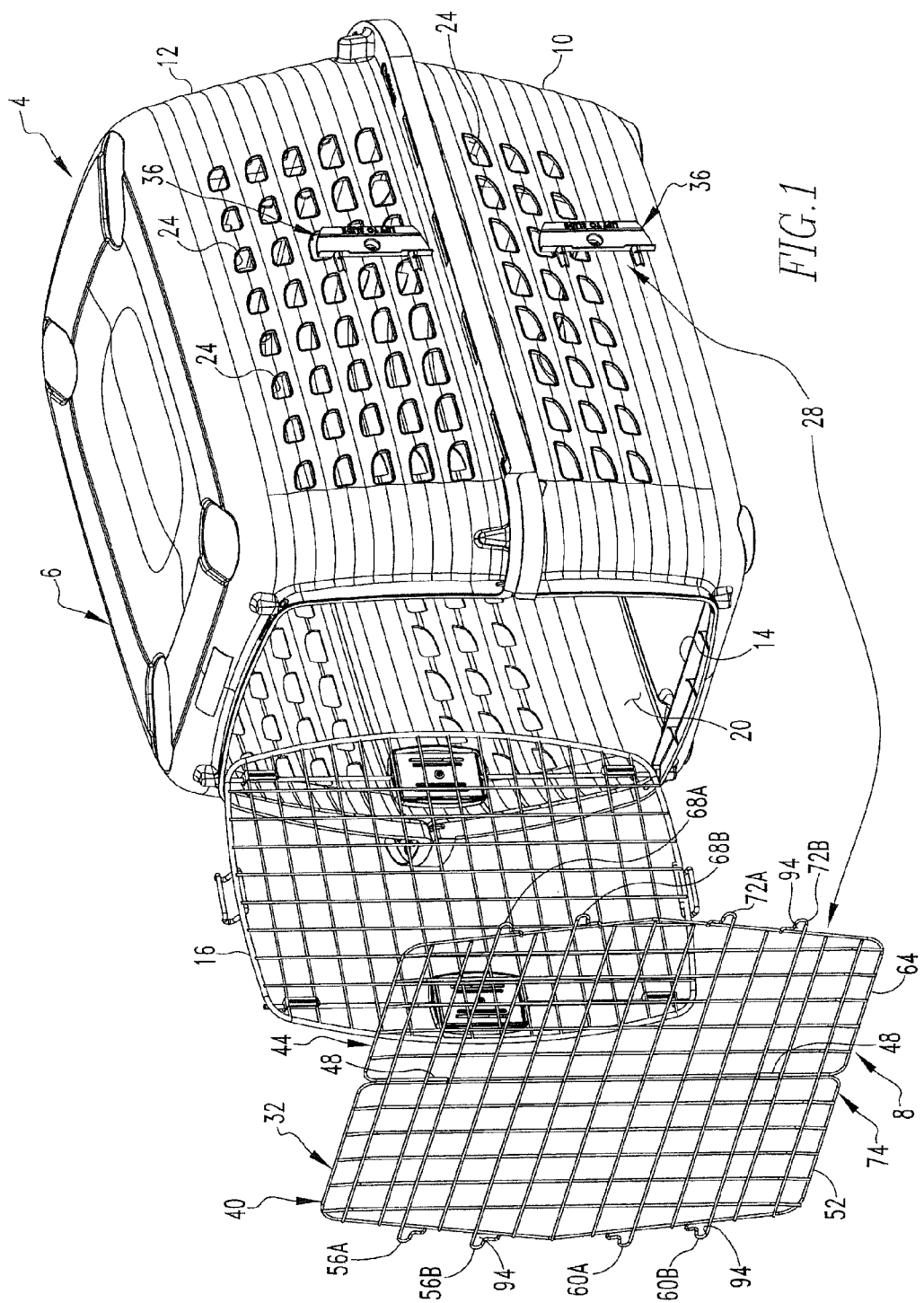
FIG. 1 is a perspective view of an improved kennel apparatus in accordance with the disclosed and claimed concept that employs a movable partition in accordance with the disclosed and claimed concept and an animal kennel, with the kennel apparatus being depicted in an exploded fashion.

An improved kennel apparatus 4 in accordance with the disclosed and claimed concept is depicted in FIG. 1 in an exploded condition. The kennel apparatus 4 can be generally said to include an animal kennel 6 and a movable partition 8 that is usable in conjunction with the animal kennel 6. The animal kennel 6 may be any of a wide variety of conventional animal kennels. The animal kennel 6 in the depicted exemplary embodiment includes a first shell 10 and a second shell 12 mounted atop the first shell 10. The first and second shells 10 and 12 can together be said to form a body of the animal kennel 6 that includes a doorway 14. The animal kennel 6 further includes a door 16 that is situated in the doorway 14 and is movable between an open condition, such as is depicted generally in FIG. 1, and a closed condition, such as is depicted generally in FIGS. 12 and 13. The animal kennel 6 further includes an interior region 20 that is situated generally between the first shell 10, the second shell 12, and the door 16. The first and second shells 10 and 12 are each formed with a number of ventilation openings 24 formed therein that are formed through the walls of the first and second shells 10 and 12 and thus can be said to extend between the interior 20 an the exterior of the animal kennel 6 and provide ventilation and light to the interior 20. As employed herein, the expression "a number of" and variations thereof shall refer broadly to any non-zero quantity, including a quantity of one. In the depicted exemplary embodiment, a plurality of the openings 24 are formed in each of the first and second shells 10 and 12, and the ventilation openings 24 are aligned with one another in rows and are spaced apart along the length of the animal kennel 6 between the doorway 14 and a closed end of the animal kennel that is opposite the doorway 14.

As can be understood from FIG. 1, the movable partition 8 can be said to include a barrier apparatus 28 that includes a barrier 32 and a set of clip apparatuses 36 that are cooperable with the barrier 32. In the depicted exemplary embodiment, the barrier apparatus 28 includes four of the clip apparatuses 36. The barrier 32 actually includes a first barrier portion 40 and a second barrier portion 44 that are hingedly connected together with a pair of hinge elements 48. The first and second barrier portions 44 in the depicted exemplary embodiment are generally rigid and have a plurality of apertures formed therein that allow for the transmission of light and ventilating air. The exemplary first and second barrier portions 44 are each depicted as being of a fence-like grate configuration formed of wire, but they can be of numerous other configurations without departing from the present concept.

The first barrier portion 40 can be said to include a first barrier body 52, a pair of mounting elements 56A and 56B situated on the first barrier body 52, and another pair of mounting elements 60A and 60B situated on the first barrier body 52. Similarly, the second barrier portion 44 can be said to include a second barrier body 64, a pair of mounting elements 68A and 68B situated on the second barrier body 64, and another pair of mounting elements 72A and 72B that are situated on the second barrier body 64. In the depicted exemplary embodiment, the mounting elements 56A, 56B, 60A, 60B, 68A, 68B, 72A, and 72B are formed as loops of the wire from which the first and second barrier portions 44 are formed, whereby the loops of the mounting elements 56A, 56B, 60A, 60B, 68A, 68B, 72A, and 72B each have a hole formed therein. The first and second barrier bodies 52 and 64 can together be said to form a hinged barrier element 74 upon which the mounting elements 56A, 56B, 60A, 60B, 68A, 68B, 72A, and 72B are mounted. As will be set forth in greater detail below, the barrier element 74 is movably positionable within the interior 20 and serves to resist the animal from moving past a reposable region that can be said to exist within the interior 20 and to be situated generally between the door 16 and the barrier element 74. The mounting elements 56A, 56B, 60A, 60B, 68A, 68B, 72A, and 72B are mountable to different sets of ventilation openings 24 to retain the barrier element 74 in any of a variety of given positions within the interior 20.

Figure 2:
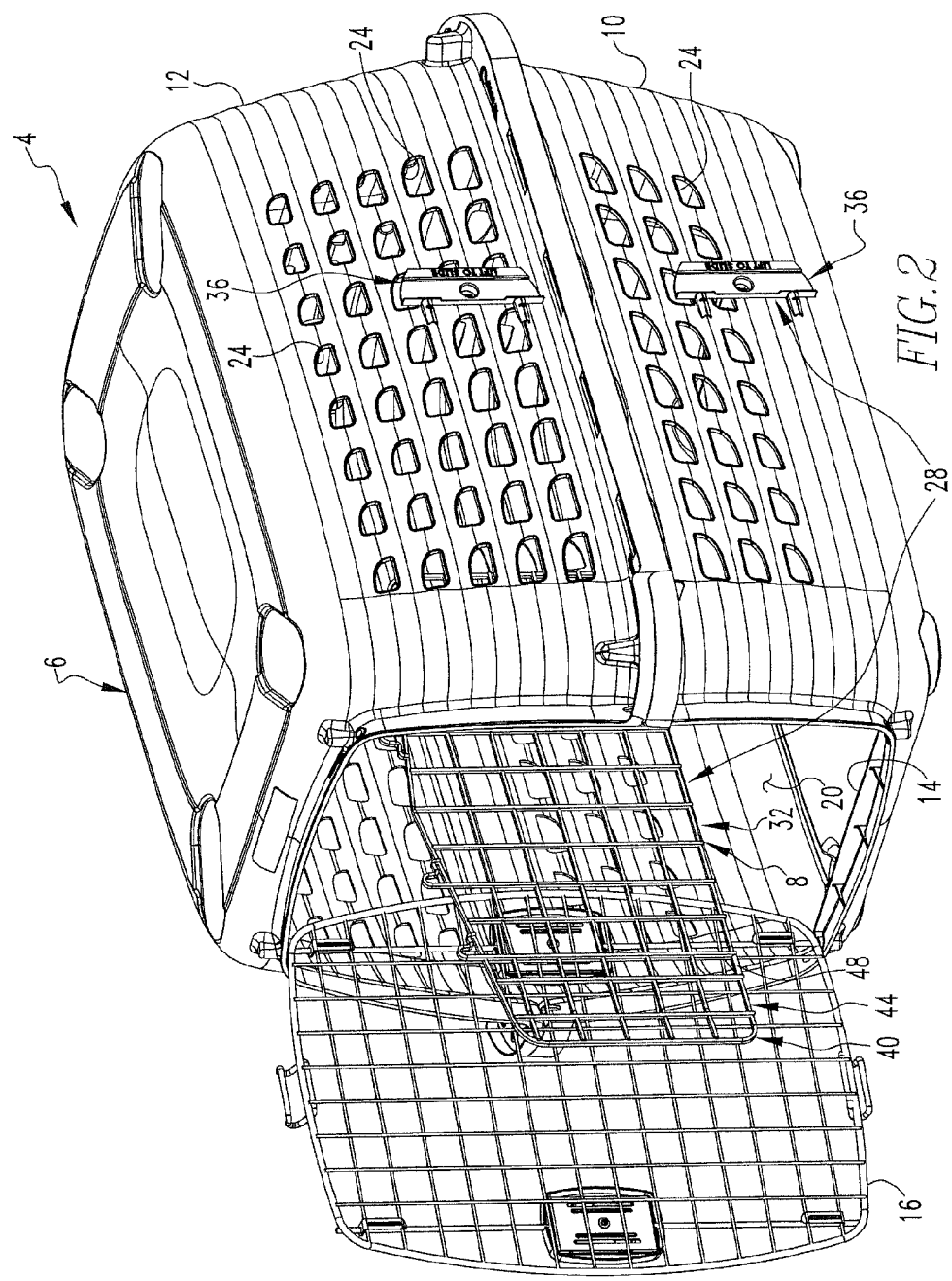
FIG. 2 is a view similar to FIG. 1, except depicting a barrier of the movable partition in a folded condition and being received through a doorway of the animal kennel.
Figure 3:
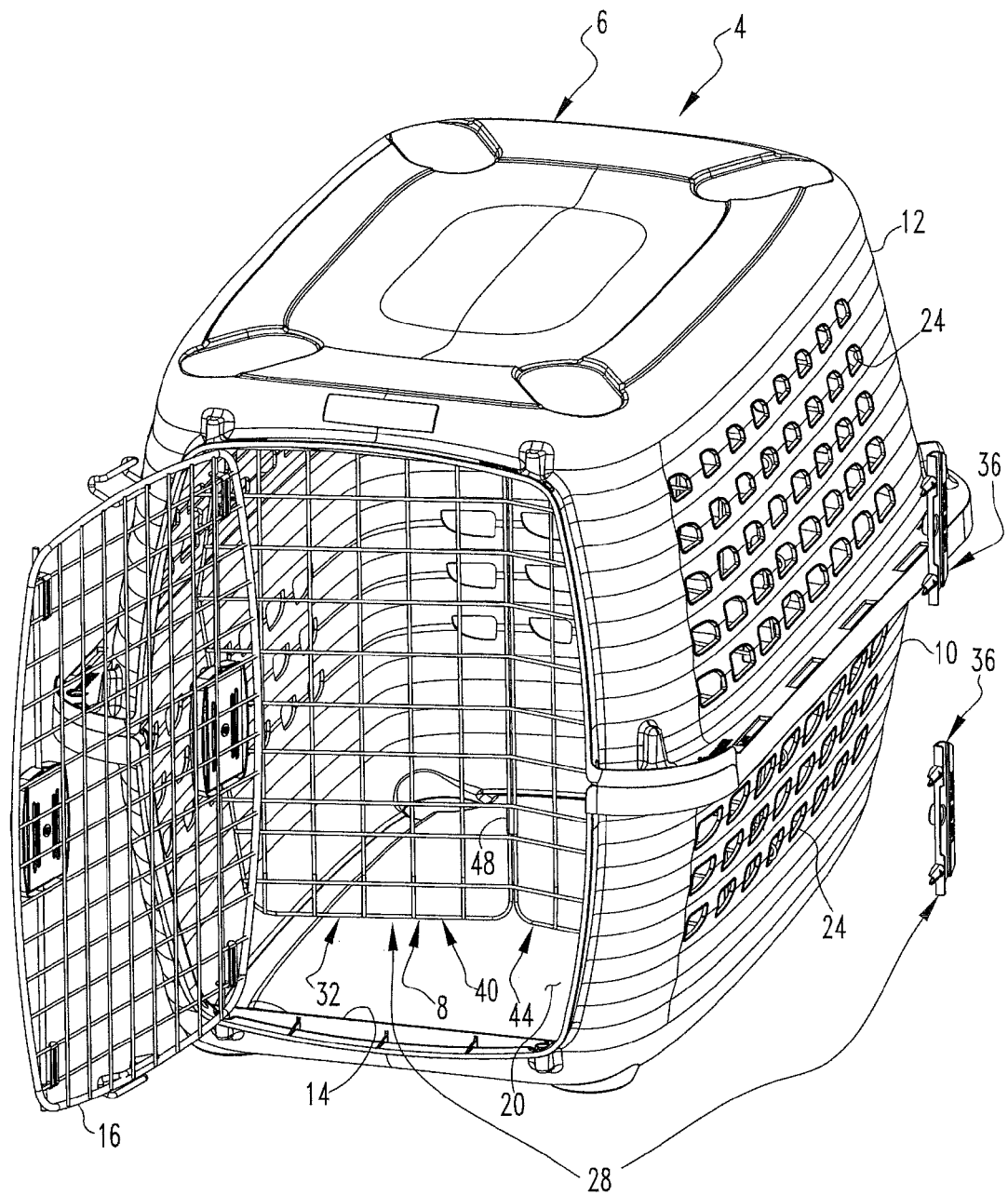
FIG. 3 is another perspective view of the kennel apparatus of FIG. 1 with the barrier in a partially unfolded condition wherein a set of mounting elements of the barrier are positioned to be receivable in a corresponding set of ventilation holes formed in the kennel.

The barrier 32 is movable between an expanded condition, such as is depicted generally in FIG. 1, and a folded condition, such as is depicted generally in FIG. 2. In the folded condition, the first and second barrier portions 40 and 44 can be said to generally overlie one another to enable the barrier 32 to be received through the doorway 14 and into the interior 20 of the animal kennel 6. When the barrier 32 is in its expanded condition situated within the interior 20, such as is depicted generally in FIGS. 3, 10, and 11, the mounting elements 56A, 56B, 60A, 60B, 68A, 68B, 72A, and 72B are received in a set of the ventilation openings 42 and are cooperable with the clip apparatuses 36 that are situated at the exterior of the animal kennel 6 to enable the mounting elements 56A, 56B, 60A, 60B, 68A, 68B, 72A, and 72B to be mounted to the set of ventilation openings 24. That is, in the folded condition of the barrier 32, the mounting elements 56A, 56B, 60A, 60B, 68A, 68B, 72A, and 72B are in a condition retracted from the ventilation openings 24. On the other hand, in the expanded condition of the barrier 32, the mounting elements 56A, 56B, 60A, 60B, 68A, 68B, 72A, and 72B are in a position received in and through the ventilation openings 24 and are capable of being mounted to the ventilation openings 24 through the use of the clip apparatuses 36 in a fashion that will be set forth in greater detail below.

Figure 4:
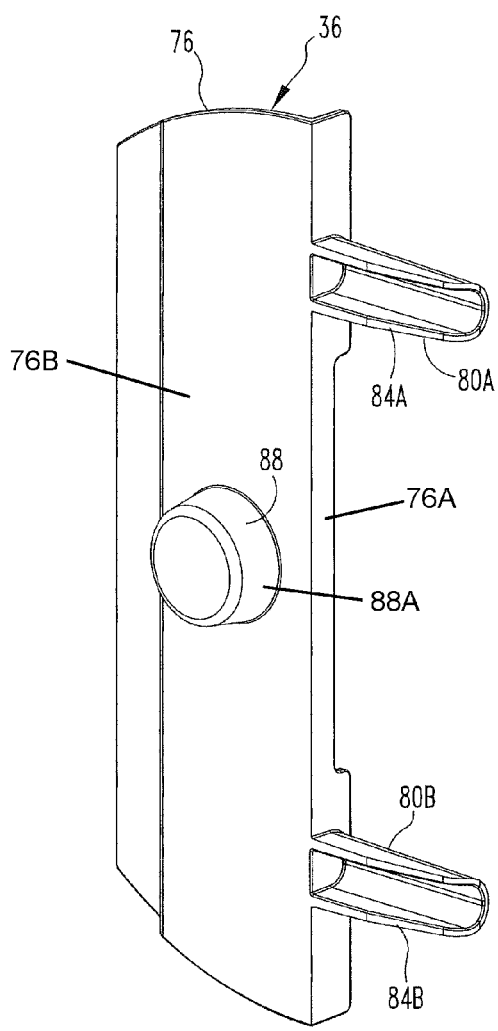
FIG. 4 is a perspective view of an improved clip apparatus in accordance with the disclosed and claimed concept.
Figure 5:
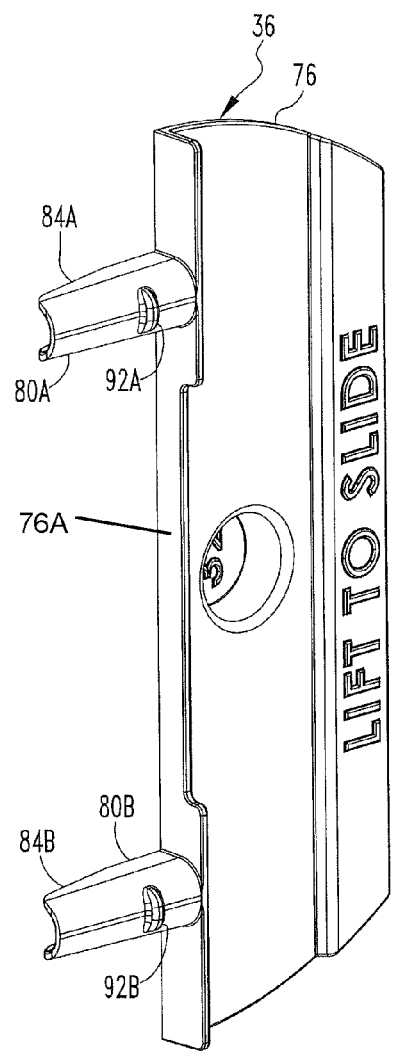
FIG. 5 is another perspective view of the clip apparatus of FIG. 4.

As can be seen in FIGS. 4 and 5, the clip apparatuses 36 each include a handle 76 and a pair of elongated pins 80A and 80B that are oriented parallel with one another and that are spaced apart and extend from a first surface 76A of the handle 76. As is best shown in FIG. 4, the pins 80A and 80B each have a ramped region 84A and 84B, respectively, that facilitate reception of the pins 80A and 80B in holes formed in the mounting elements 56A, 56B, 60A, 60B, 68A, 68B, 72A, and 72B.

The clip apparatuses 36 can be said to each additionally include a number of locking lugs that include a locking peg 88 that is best depicted in FIG. 4 and a pair of locking ledges 92A and 92B that are best shown in FIG. 5 and that protrude from the pins 80A and 80B, respectively. As can be understood from FIGS. 4 and 5, a lug surface 88A of the locking peg 88 extends from a second surface 76B of the handle 76 in one direction, and the locking ledges 92A and 92B extend from the handle 76 in another direction that is orthogonal thereto. Additionally, the aforementioned one direction and the aforementioned another direction are each generally orthogonal to the direction in which the pins 80A and 80B extend from the handle 76.

In order to mount the movable partition 8 within the interior 20, the barrier 32 in its folded condition, or in an at least partially folded condition, is received through the doorway 14 into the interior 20, such as is depicted generally in FIG. 2. The barrier 32 is then hingedly unfolded toward the expanded condition such as is depicted generally in FIG. 3 until the mounting elements 56A, 56B, 60A, 60B, 68A, 68B, 72A, and 72B are received in a set of the ventilation openings 24. In such position, and as is depicted in part in FIG. 6, the mounting elements 56A, 56B, 60A, 60B, 68A, 68B, 72A, and 72B are received in and extend through the ventilation openings 24 and protrude out of the ventilation openings 24 at the exterior of the animal kennel 6. The holes that are formed in each of the mounting elements 56A, 56B, 60A, 60B, 68A, 68B, 72A, and 72B are indicated generally with the numeral 94, with the holes 94 being structured to receive the pins 80A and 80B therein.

Figure 6:
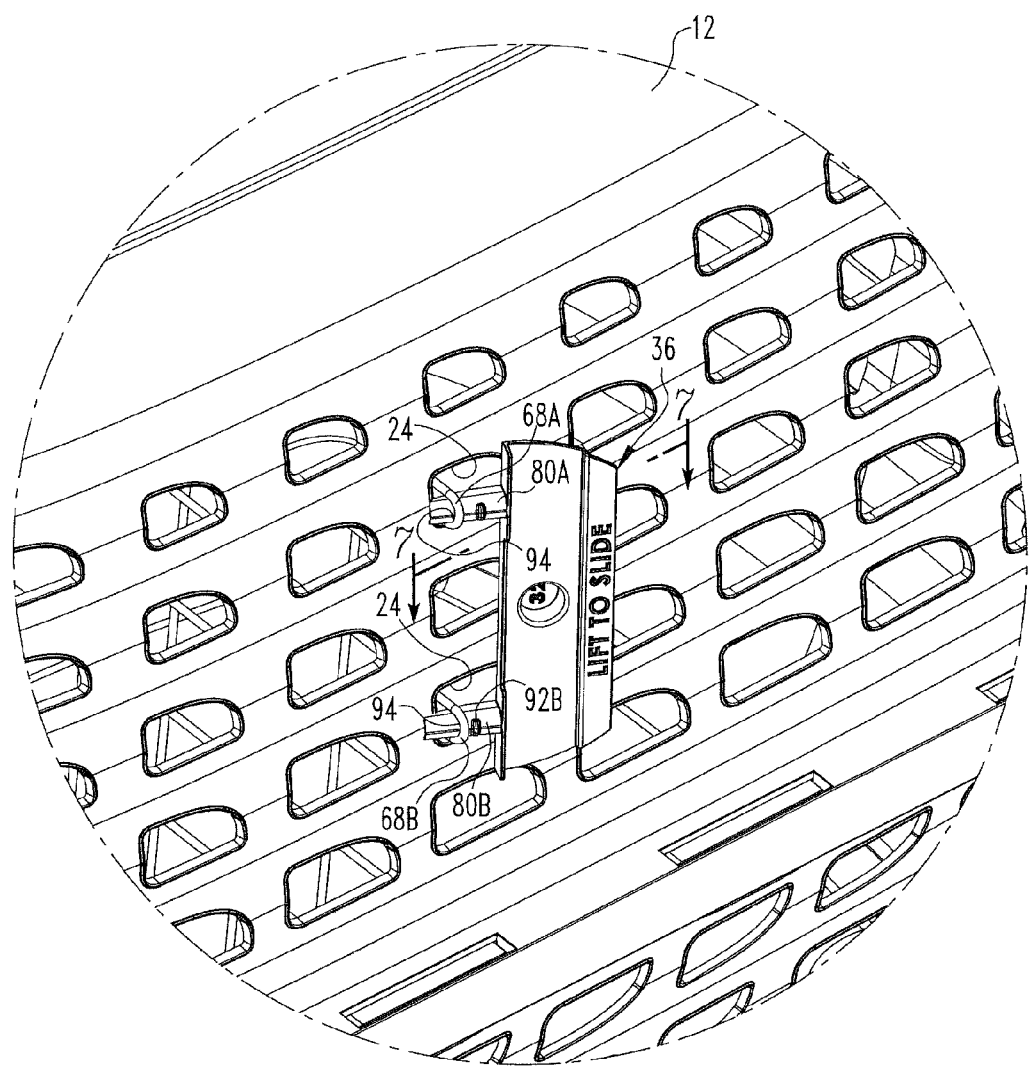
FIG. 6 is an enlarged view of the kennel with the mounting elements received in the ventilation openings and with the clip apparatus partially received in holes formed in the mounting elements.
Figure 7:
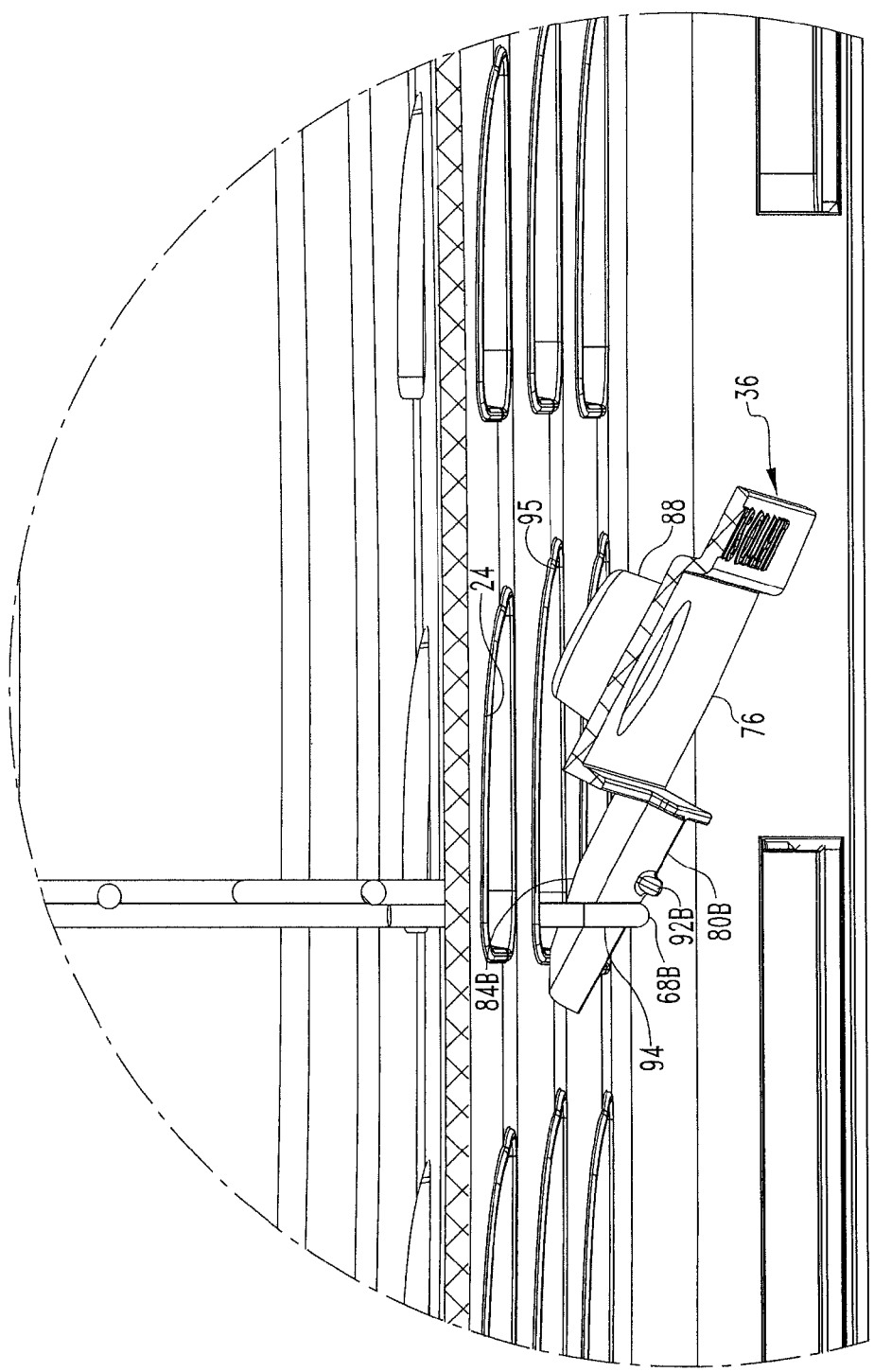
FIG. 7 is a sectional view as taken along line 7-7 of FIG. 6.
Figure 8:
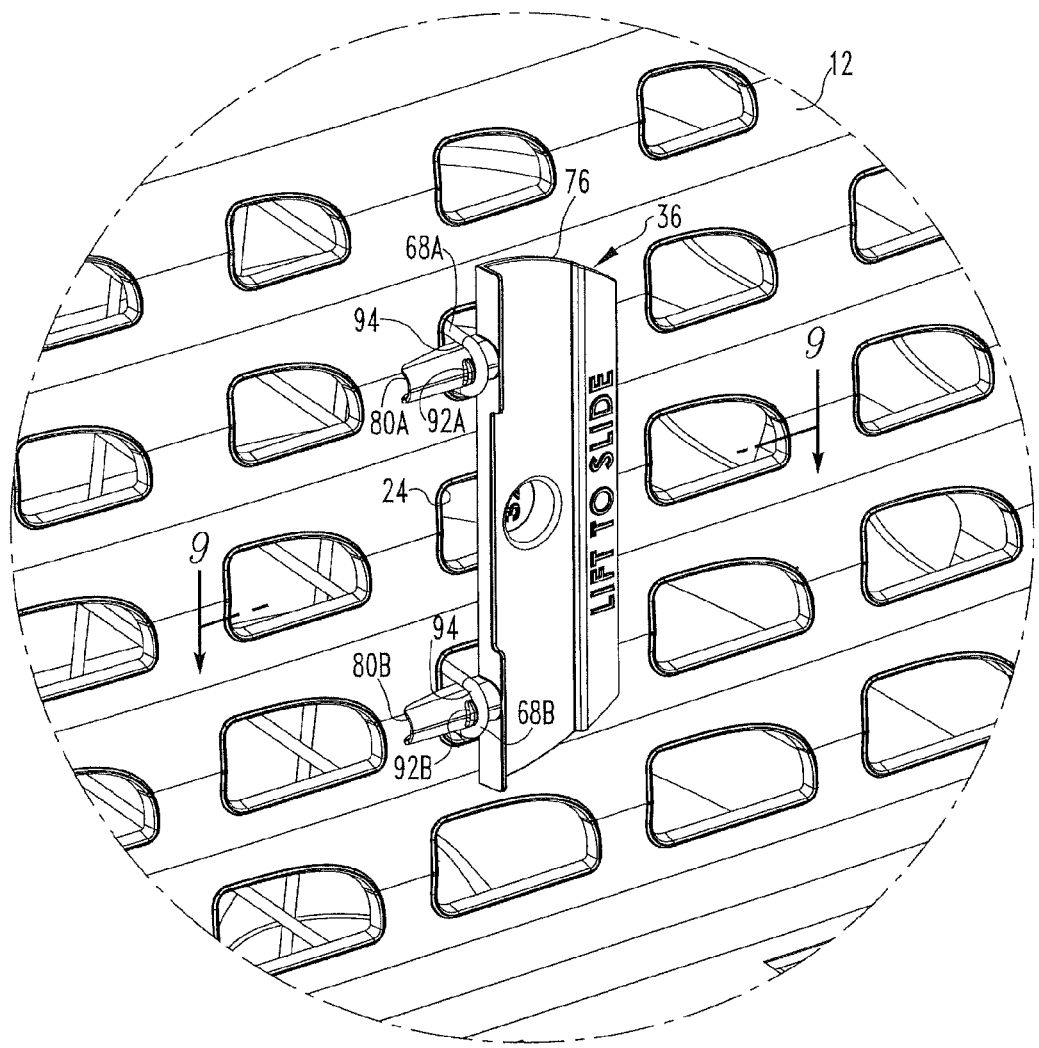
FIG. 8 is a view similar to FIG. 6, except depicting the clip apparatus fully received in the holes and mounted to a ventilation opening.
Figure 9:
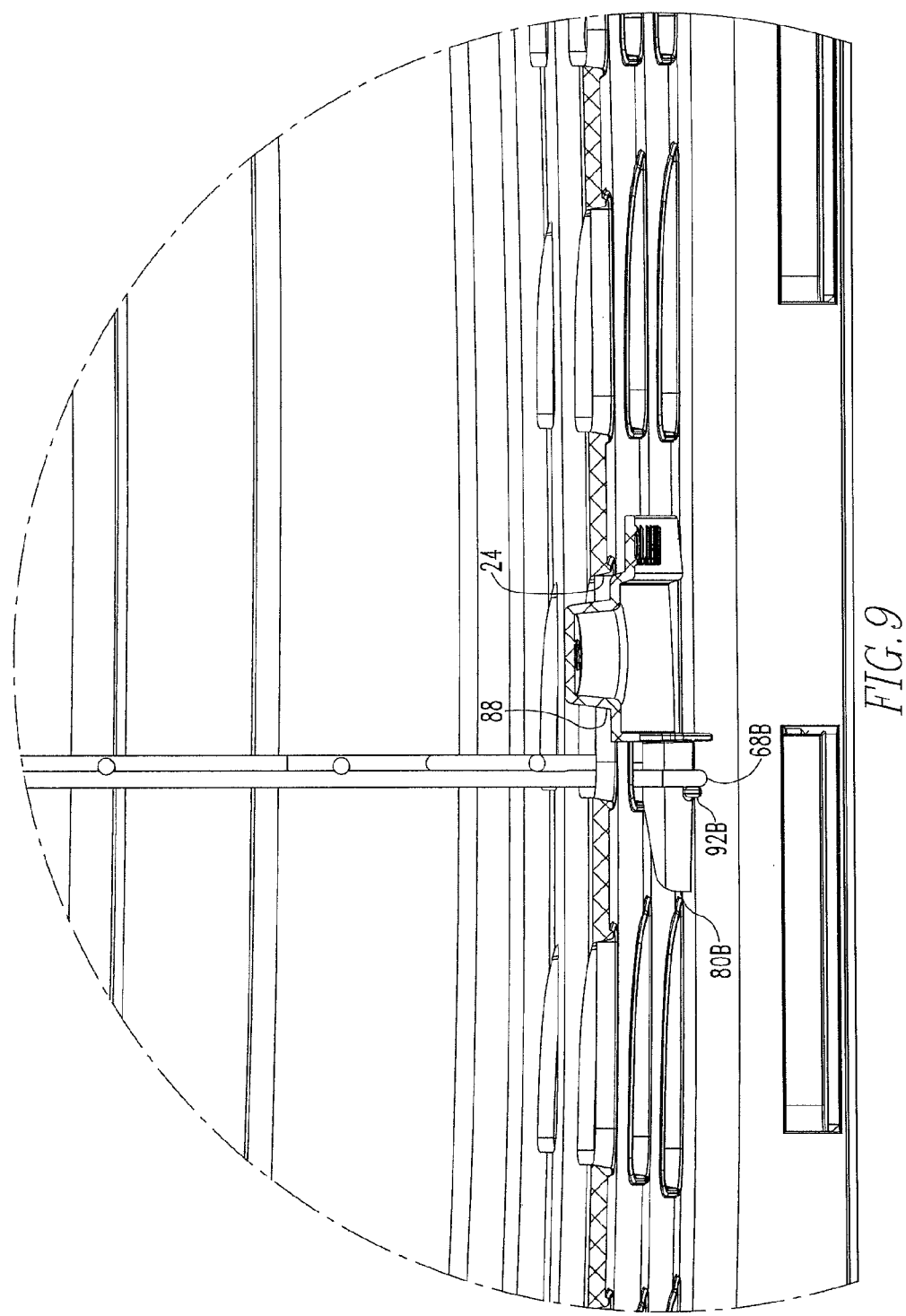
FIG. 9 is a sectional view as taken along line 9-9 of FIG. 8.
Figure 12:
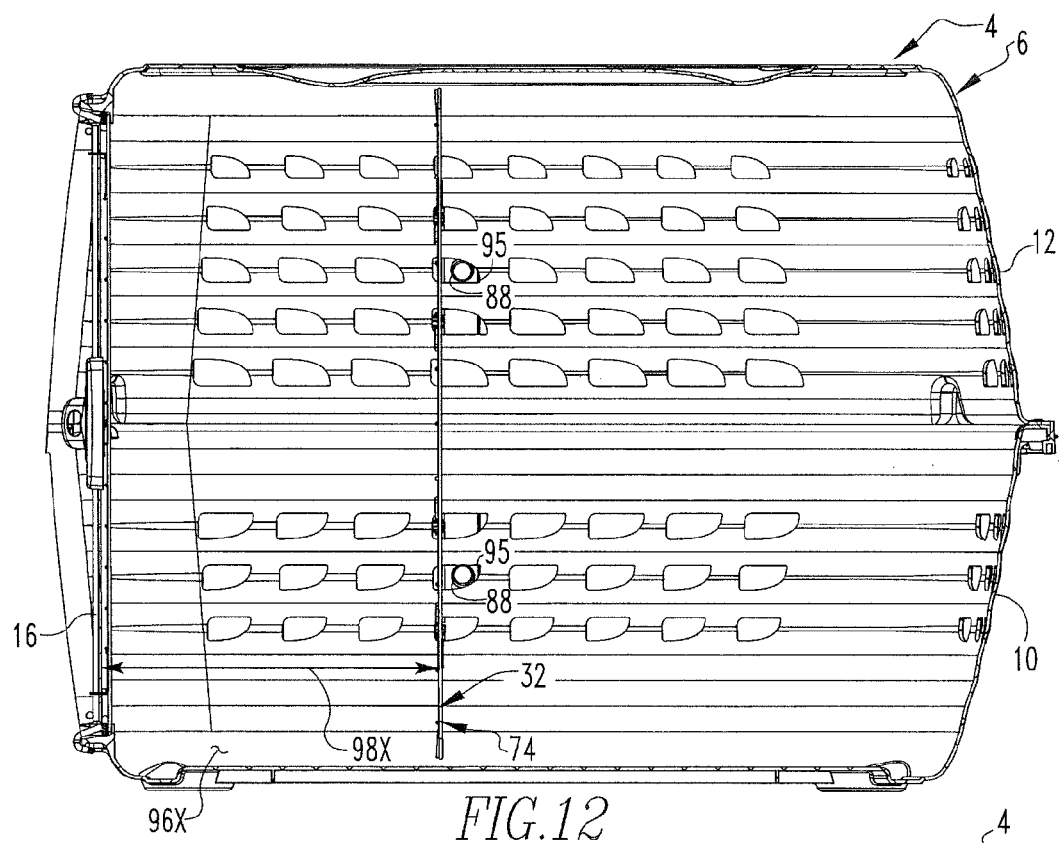
FIG. 12 is a sectional view as taken along line 12-12 of FIG. 10 except depicting the door being in a closed condition.
Figure 13:
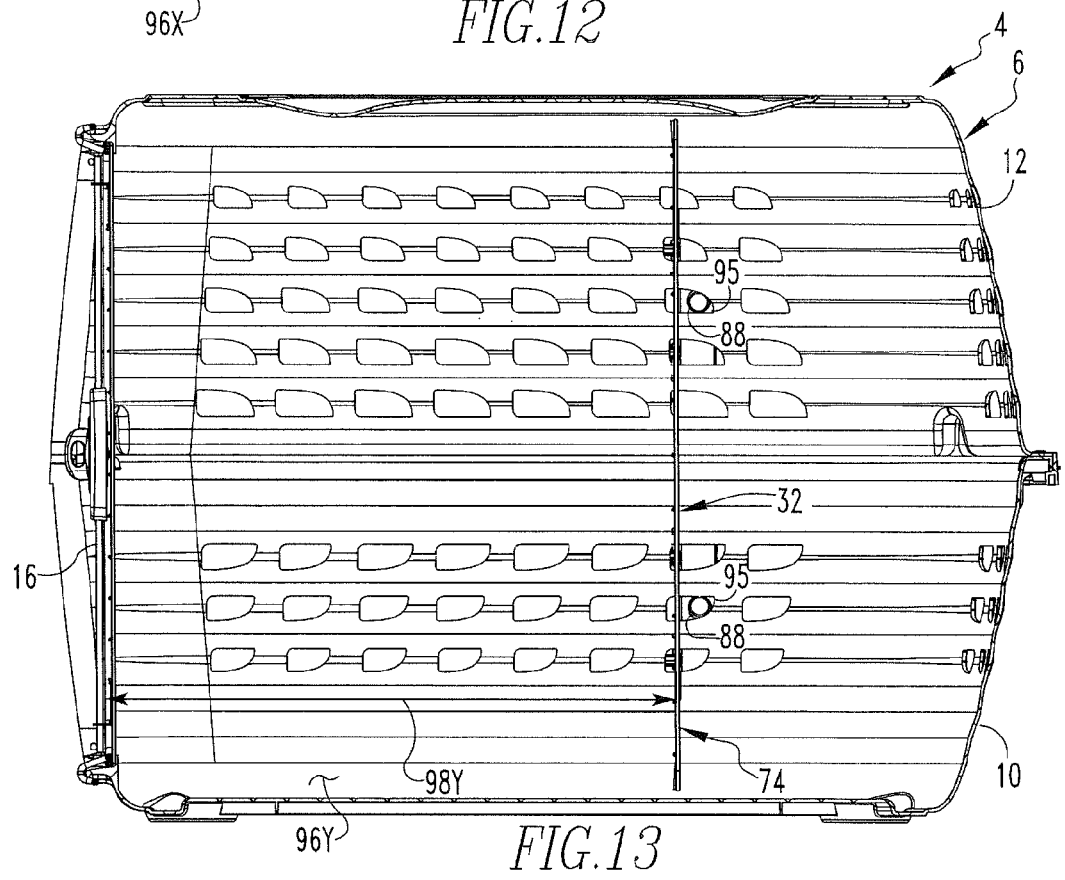
FIG. 13 is a sectional view as taken along line 13-13 of FIG. 11, except depicting the door being in a closed position.

More specifically, and as is depicted generally in FIGS. 6 and 7, the pins 80A and 80B are received in the holes 94 by first orienting the clip apparatus 36 such that the ramped regions 84A and 84B face toward an exterior surface of the animal kennel 6 and are oriented generally parallel therewith. In such a position, the handle 76 can be seen to be situated at an oblique angle with respect to the animal kennel, as is best depicted in FIG. 7. The clip apparatus 36 is then advanced toward the holes 94 to cause the pins 80A and 80B to be receive in the holes 94. When the pins 80A and 80B are fully received in the holes 94, the handle 76 can be pivoted toward the animal kennel 6 to cause the locking peg 88 to be received in and mounted to one of the ventilation openings 24. This is illustrated generally in FIG. 9, it being noted that the irregular shape of the ventilation openings 24 causes a relieved region 95 (FIGS. 12 and 13) at a corner of the ventilation openings 24 to appear in FIG. 9 to be spaced from the locking peg 88, and it is understood that other portions of the lateral surface of the locking peg 88 are mounted to and engaged with portions of the lateral surface of the corresponding ventilation opening 24, as is depicted in FIGS. 12 and 13. After such pivoting, the locking ledges 92A and 92B have been received through the holes 94 and are engagable with the mounting elements 56A, 56B, 60A, 60B, 68A, 68B, 72A, and 72B to further retain the clip apparatus 36 in the position depicted generally in FIGS. 8 and 9 installed on the barrier 32. In the locked position of the clip apparatus 36 that is depicted generally in FIGS. 8 and 9 (and elsewhere in the accompanying drawings), the locking peg 88 is mounted to one of the ventilation openings 24, the pins 80A and 80B are received in a pair of the holes 94 formed in a pair of the mounting elements 56A, 56B, 60A, 60B, 68A, 68B, 72A, and 72B, and the locking ledges 92A and 92B are further engagable with the same pair of the mounting elements 56A, 56B, 60A, 60B, 68A, 68B, 72A, and 72B. The locking lugs which, as set forth above, include the locking peg 88 and the locking ledges 92A and 92B, retain the pins 80A and 80B in the holes 94 to retain the barrier apparatus 28 in a given position within the interior 20 of the animal kennel 6.

It is also understood that the clip apparatuses 36 can be removed from the mounting elements 56A, 56B, 60A, 60B, 68A, 68B, 72A, and 72B in order to permit the barrier apparatus 28 to be moved and mounted to a different set of the ventilation openings 24. More specifically, the clip apparatuses 36 are removed from the mounted elements 56A, 56B, 60A, 60B, 68A, 68B, 72A, and 72B, by first pivoting the handle 76 away from the exterior surface of the animal kennel 6 to cause the locking peg 88 to be removed from its position engaged with the ventilation opening 24. The pins 80A and 80B are then removed from the holes 94, and the barrier 32 is at least partially moved toward its folded condition in order to remove the mounting elements 56A, 56B, 60A, 60B, 68A, 68B, 72A, and 72B from the ventilation openings 24. Afterward, the barrier 32 is moved to a desired different position along the interior 20 and is moved toward its expanded condition to cause the mounting elements 56A, 56B, 60A, 60B, 68A, 68B, 72A, and 72B to be received in a different set of the ventilation openings 24. The clip apparatuses 36 can then be received in the holes 94 and the locking peg 88 received in a ventilation opening 24 as set forth above to retain the barrier 32 in the new position within the position 20.

Figure 10:
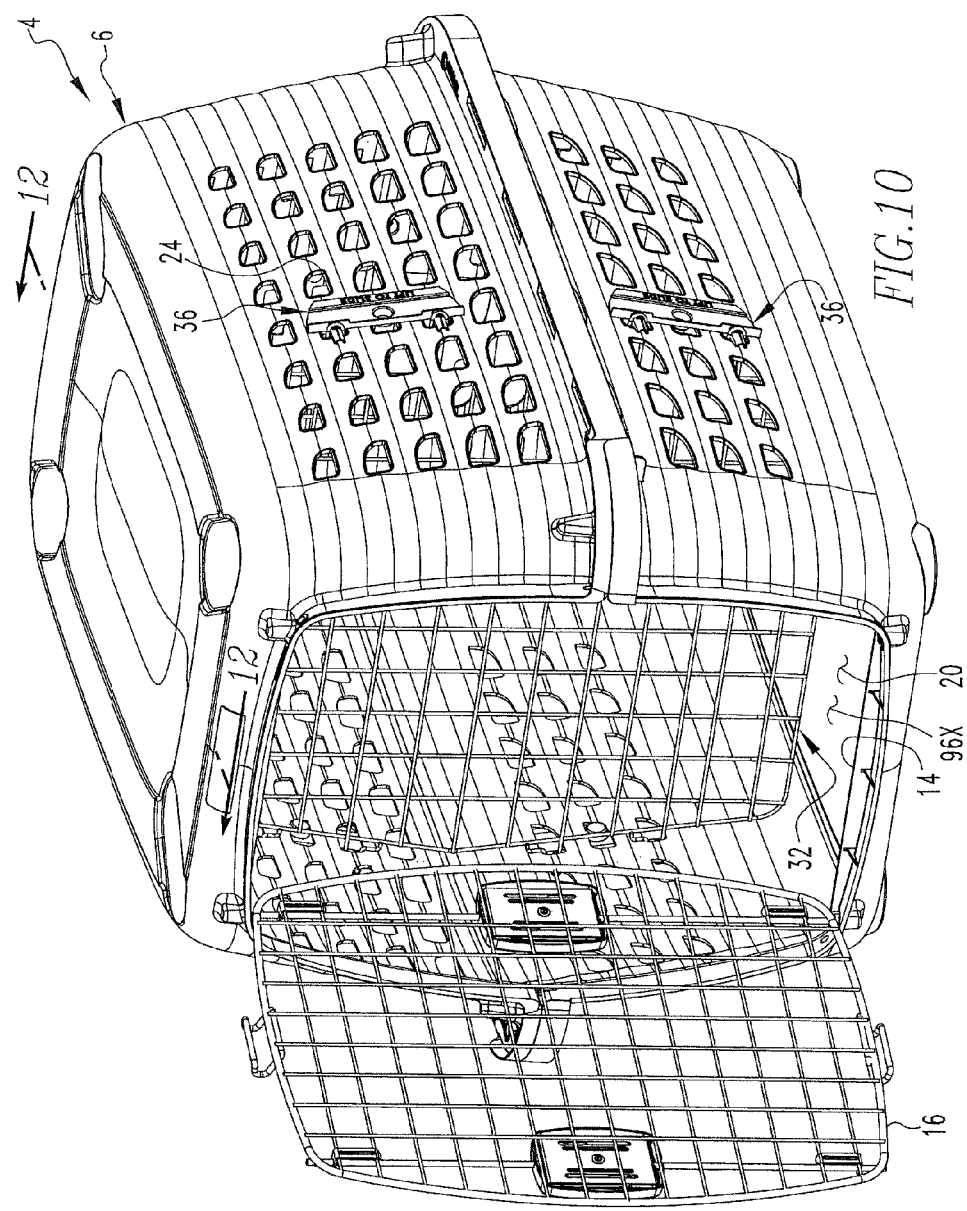
FIG. 10 is a perspective view of the kennel apparatus with the movable partition installed in a first position thereon.
Figure 11:
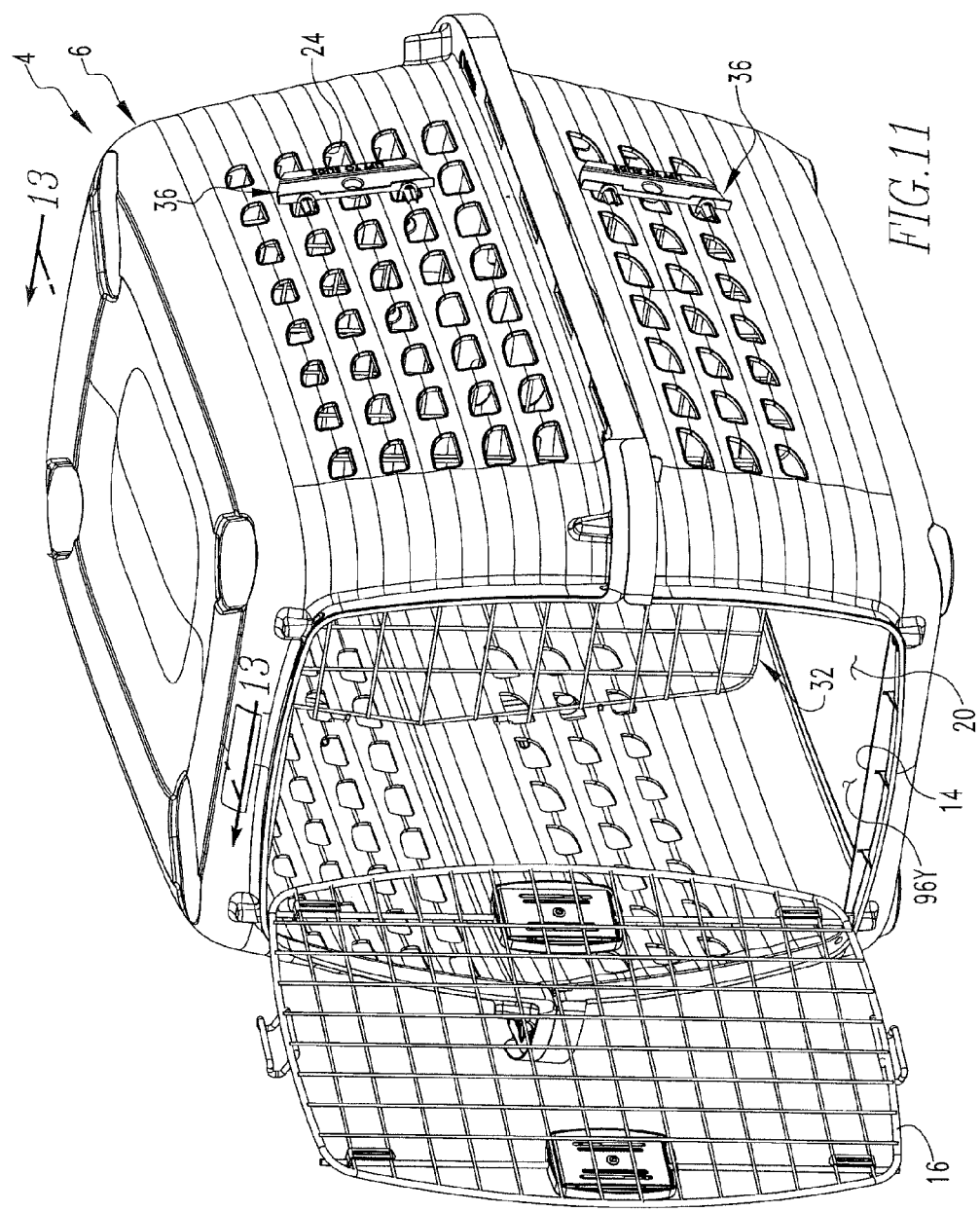
FIG. 11 is a view similar to FIG. 10, except depicting the movable partition installed at a second position on the kennel apparatus.

Such different positioning is depicted in FIGS. 10 and 11 and is further depicted in section in FIGS. 12 and 13 (albeit with the door 16 in a closed position). It can be seen that the barrier 32 in the position depicted generally in FIGS. 10 and 12 is at a first distance 98X from the door 16 and thereby forms between the barrier 32 and the door 16 a reposable region 96X within which an animal can be received and reposed. In the position of the barrier 32 depicted generally in FIGS. 11 and 13, the barrier 32 is situated at a different distance 98Y from the door 16 which forms a differently sized reposable region 96Y that is larger than the reposable region 96X and within which the animal can be reposed.

It thus can be seen that the improved movable partition 8 is movable and lockable at any of a variety of different distances from the door 16 to create any of a wide variety of differently sized reposable regions within the interior 20 that can accommodate an animal of correspondingly varying size therein. The movable partition 8 and the resultant kennel apparatus 4 thus advantageously can be usable to repose therein an animal during its growth stage while facilitating training of the animal, which is highly advantageous.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A clip apparatus comprising:
a barrier element having a plurality of mounting elements;
an animal kennel having a plurality of openings; and
a clip structured to secure the barrier element to the animal kennel, the clip having
a first pin structured to engage a first mounting element of the plurality of mounting elements to retain the first mounting element relative to the animal kennel at a first opening of the plurality of openings so that the barrier element is retained relative to the animal kennel within an interior portion of the animal kennel, the first pin having a longitudinal length extending from a first surface of the clip apparatus in a first direction, and
a locking lug structured to engage a second opening of the plurality of openings to retain the first pin in engagement with the mounting element, the locking lug having a lug surface protruding away from a second surface of the clip apparatus that is orthogonal to the first surface such that the lug surface extends in a second direction that is orthogonal to the first direction.

2. The clip apparatus of claim 1, wherein
the plurality of mounting elements are disposed generally peripherally on the barrier element and protrude from the barrier element, the barrier element comprising a first portion and a second portion that are connected together and that are pivotable with respect to one another between an at least partially folded configuration and an expanded configuration;
at least some of the plurality of mounting elements being structured to be mountable to at least some of the plurality of openings of the animal kennel and being further structured to retain the barrier element in a given position within an interior of the animal kennel, the barrier element being structured to resist the animal from moving therepast.

3. The clip apparatus of claim 2 wherein
in the at least partially folded configuration the at least some of the plurality of mounting elements are structured to be in a condition retracted from the at least some of the plurality of openings, and wherein in the expanded configuration the at least some of the plurality of mounting elements are structured to be in a condition received in the at least some of the plurality of openings.

4. The clip apparatus of claim 3 wherein
in the folded configuration the first and second portions at least partially overlie one another, and
in the expanded configuration first and second portions are situated adjacent one another.

5. The clip apparatus of claim 4 wherein
a mounting element of the plurality of mounting elements is disposed on the first portion;
another mounting element of the plurality of mounting elements is disposed on the second portion; and
the mounting element and the another mounting element protrude in generally opposite directions away from the barrier element in the expanded configuration of the barrier element.

6. The clip apparatus of claim 2 further comprising
a plurality of clip apparatuses that are cooperable with the plurality of mounting elements and are structured to retain the at least some of the plurality of mounting elements in a condition mounted to the at least some of the plurality of openings.

7. The clip apparatus of claim 2 wherein
the at least some of the plurality of mounting elements are structured to be receivable in the at least some of the plurality of openings.

8. The clip apparatus of claim 7 further comprising
a plurality of clip apparatuses that are cooperable with the plurality of mounting elements and are structured to retain the at least some of the plurality of mounting elements in a condition received in the at least some of the plurality of openings.

9. The clip apparatus of claim 8 wherein
the plurality of mounting elements each have a hole formed therein, and wherein the plurality of clip apparatuses each have a pin, each pin being receivable in the hole of a mounting element of the plurality of mounting elements.

10. The clip apparatus of claim 9 wherein
the plurality of clip apparatuses each further have a locking lug that is structured to be engageable with an opening of the plurality of openings to retain its pin received in the hole of a mounting element of the plurality of mounting elements.

11. The clip apparatus of claim 10 wherein
the pin and the locking lug extend from the clip apparatus in generally orthogonal directions.

12. The clip apparatus of claim 10 wherein
the plurality of clip apparatuses each have another pin, and wherein the pin and the another pin are oriented generally parallel with one another.

13. The clip apparatus of claim 10 wherein
the plurality of clip apparatuses each have another pin, and wherein the locking lug is situated generally between the pin and the another pin.

14. The clip apparatus of claim 1 wherein
the clip further comprises a second pin extending in the first direction so that the first pin and the second pin have longitudinal lengths that are generally parallel with respect to one another, the locking lug being disposed generally between the first pin and the second pin.

* * * * *